United States Patent [19]

Barrett

[11] 4,191,018

[45] Mar. 4, 1980

[54] FLUID TRANSMISSION

[76] Inventor: George M. Barrett, R.R. #5, Galt, Ontario, Canada, N1R 5S6

[21] Appl. No.: 901,073

[22] Filed: Apr. 28, 1978

[51] Int. Cl.² .............................................. F15B 13/09
[52] U.S. Cl. ........................................ 60/428; 60/486; 417/426; 417/429
[58] Field of Search ................... 417/216, 426, 429, 3; 92/13.3; 60/428, 486, 476, 493; 180/66 R

[56]   References Cited
U.S. PATENT DOCUMENTS

| 1,835,977 | 12/1931 | Ernst et al. | 60/430 X |
| 2,891,771 | 6/1959 | Ashton | 60/428 |
| 2,960,828 | 11/1960 | Gould | 60/486 X |
| 3,037,488 | 6/1962 | Barrett | 91/498 |
| 3,241,463 | 3/1966 | Barrett | 92/13 |
| 3,734,225 | 5/1973 | Kobald et al. | 180/66 R |
| 3,983,700 | 10/1976 | Barrett | 60/445 |
| 3,990,235 | 11/1976 | Bauchet | 60/483 X |
| 4,077,211 | 3/1978 | Fricke | 60/428 |

Primary Examiner—Edgar W. Geoghegan
Attorney, Agent, or Firm—Charles E. Brown

[57]   ABSTRACT

A fluid transmission which includes a hydraulic pump combination and a hydraulic motor. The hydraulic pump combination includes a first pump which is a variable volume, variable direction pump and a second pump which is a constant volume, constant direction pump. The combined outputs of the first and second pumps are directed to a hydraulic motor at variable rates and in reversible directions.

9 Claims, 1 Drawing Figure

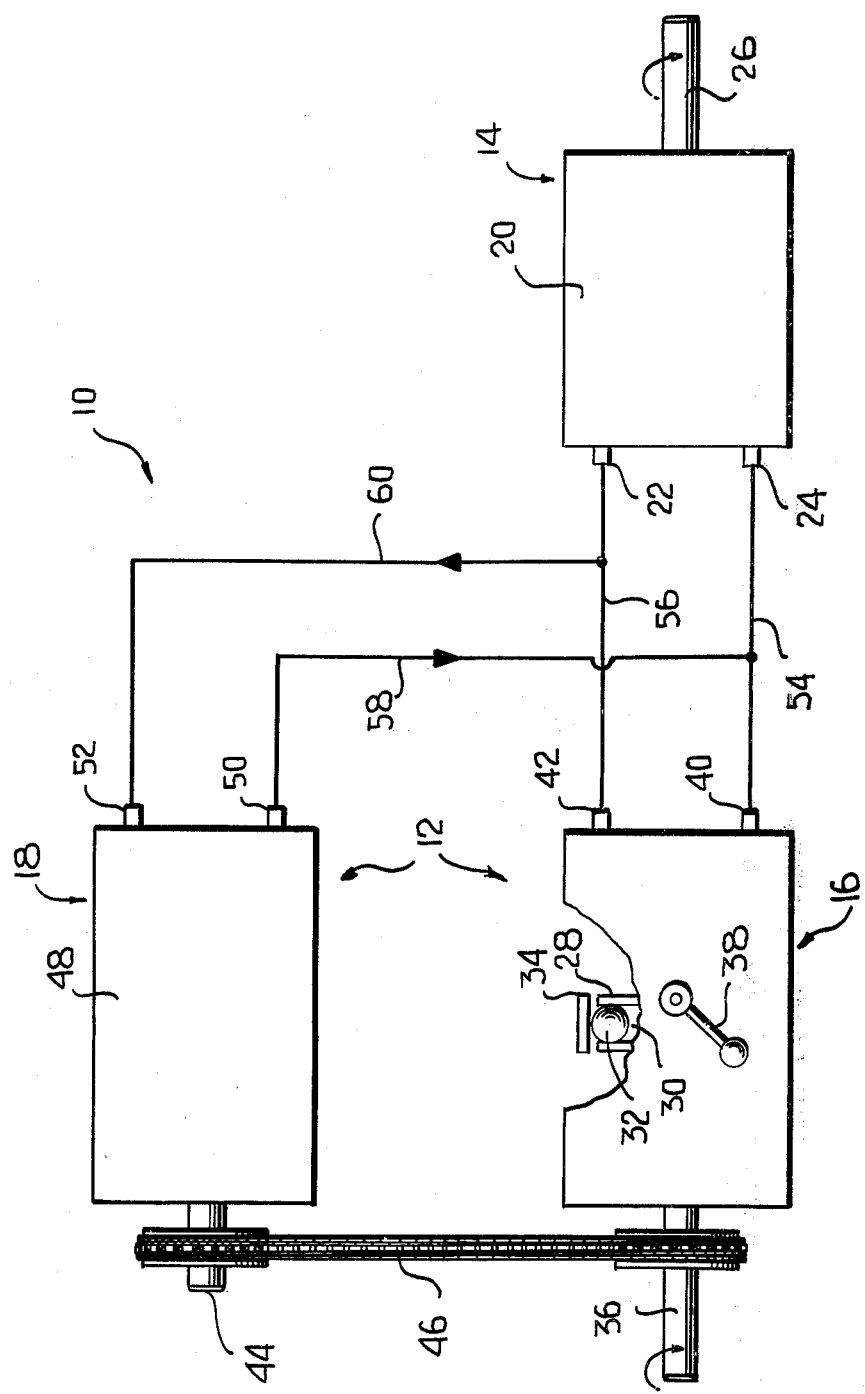

FLUID TRANSMISSION

This invention relates in general to new and useful improvements in transmissions, and more particularly to a hydraulic transmission.

Hydraulic transmissions including a pump unit which is of a variable displacement, variable direction type and an associated hydraulic motor are well known. For example, such a hydraulic transmission is disclosed in my U.S. Pat. No. 3,983,700, granted Oct. 5, 1976.

A variable pump unit is also disclosed in my U.S. Pat. No. 3,241,463, granted Mar. 22, 1966.

Further, a suitable hydraulic motor, which may also be utilized as a hydraulic pump, is disclosed in my U.S. Pat. No. 3,037,488, granted June 5, 1962.

I have found that the most efficient type of hydraulic pump unit of the variable displacement, variable direction type is a piston type pump. However, I have found that when the output of such a pump unit closely approaches zero, the stroke of the ball pistons is so minute that it is extremely difficult to control the output thereof.

I have also found that with hydraulic transmissions utilizing a pump unit of the variable displacement, reversible direction type, the output of the pump unit is the same in both the forward and reverse direction. On the other hand, with respect to a hydraulic transmission which is utilized in conjunction with vehicles, the normal ratio of forward direction speed to reverse direction speed is three to one.

I have found that the aforementioned deficiencies of my prior hydraulic transmissions may be readily overcome by providing a pump combination which includes a variable speed, reversible direction pump unit in combination with a conventional pump which is of a constant volume, constant direction output. Assuming that the pump unit having a variable volume, variable directional output has a maximum output on the order of twice the output of the constant volume, constant direction pump, it will be seen that when the outputs of the pump combination are additive, the total volume of the pump combination is three times that of the constant volume pump. On the other hand, when the variable direction pump unit is pumping in the reverse direction and the outputs are additive, the combined output of the two pumps is equal to the output of the constant volume pump in a reverse direction. Thus the maximum volumes of the two pumps in a positive direction may be three times that of the combined volumes in a reverse direction. Further, it will be apparent that there are minimum instances where the output of the variable volume pump unit will be close to zero.

With the above, and other objects in view that will hereinafter appear, the nature of the invention will be more clearly understood by reference to the following detailed description, the appended claims and the single view illustrated in the accompanying drawing.

The drawing is a schematic view showing the arrangement of the pump units and motor unit of the hydraulic transmission.

Referring now to the drawing, it will be seen that there is illustrated a hydraulic transmission formed in accordance with this invention, the transmission being generally identified by the numeral 10. The transmission 10 includes a pump combination, generally identified by the numeral 12, hydraulically coupled to a motor unit 14. The pump combination 12 includes a variable volume, reversible direction pump unit, generally identified by the numeral 16, and a constant volume, constant direction pump unit, generally identified by the numeral 18.

First of all, it is to be understood that the motor unit 14 may be of any type, but is preferably of the type disclosed in my U.S. Pat. No. 3,037,488 and includes a housing 20 having fluid fittings 22 and 24 and a drive shaft 26. For descriptive purposes, it needs to be understood that when hydraulic fluid is directed into the housing 20 through the fitting 24 and exits through the fitting 22, the drive shaft 26 will rotate in a predetermined direction, for example a clockwise direction. On the other hand, when the hydraulic fluid enters into the housing 20 through the fitting 22 and exits through the fitting 24, the direction of rotation of the drive shaft 26 will be reversed.

The pump unit 16 is of the type specifically disclosed in my U.S. Pat. Nos. 3,241,463 and 3,983,700 and includes a rotor 28 having defined therein a plurality of cylinders 30 each of which carries a ball piston 32. The pistons 32 ride against a cam race 34 which is shiftable so as to vary the effective stroke of each piston 32.

The rotor 28 has attached thereto a drive shaft 36 and the position of the cam race 34 is controlled by a suitable actuator, such as the actuator 38. Inner ends of the cylinders 30 are connected by means of passages (not shown) to fittings 40 and 42, the fitting 40 being an output fitting and the fitting 42 being an inlet fitting during the normal operation of the pump unit 16 and the relationship of the fittings reversing when the cam race 34 is shifted to a reverse position.

The pump unit 18 is a conventional pump unit of any desired type. It may, however, be a piston type pump unit of the general type disclosed in U.S. Pat. No. 3,037,488. The pump unit 18 includes a drive shaft 44 which, in most installations, will be coupled to the drive shaft 36 for rotation therewith. Accordingly, the drive shafts 36, 44 are illustrated as being coupled together by a chain and sprocket drive assembly 46.

Pump unit 18 includes a housing 48 which is provided with an output fitting 50 and an inlet fitting 52. These fittings remain constant in that the pump unit 18 is of the constant directional type.

It will be seen that in the coupling of the pump combination 12 to the motor unit 14, a hydraulic line 54 extends between the fittings 40 and 24 while a hydraulic line 56 extends between the fittings 42 and 22. A hydraulic line 58 extends between the fitting 50 and the hydraulic line 54 while a further hydraulic line 60 extends between the fitting 52 and the hydraulic line 56.

When the pump unit 16 is operating in a positive direction, flow will be through the hydraulic line 54 from the fitting 40 to the fitting 24 and then back in a reverse direction from the fitting 22 to the fitting 42 through the hydraulic line 56. Thus the output of the pump unit 18 is added to that of the pump unit 16. On the other hand, when the pump unit 16 is operating in the reverse direction, flow of hydraulic fluid therefrom is through the fitting 42 and thus to the motor 14 through the hydraulic line 56. Thus the output of the pump unit 16 is negative as compared to that of the pump unit 18 and the net result is that hydraulic fluid enters into the housing 20 of the motor unit 14 through the fitting 22 and exits from the fitting 24 causing the drive shaft 26 to rotate in a reverse direction.

It will be seen that when the ratio of outputs of the pump units 16 and 18 is 2 to 1, when the output of the pump unit 16 in a forward direction is maximum, the output of the pump combination 12 is three times that of the pump unit 18. On the other hand, when the output of the pump unit 16 is zero, the output of the pump combination is equal to that of the pump unit 18. Thus when the output of the pump combination 12 is to be zero, the output of the pump unit 16 must be equal to the volume of the output of the pump unit 18, but in a reverse direction. Finally, it will be apparent that when the output of the pump unit 16 is a maximum in a reverse direction, the output of the pump combination 12 is equal to the output of the pump unit 18, but in a reverse direction.

It will be readily apparent that when low speeds of the motor 14 are required in either a positive or reverse direction, the output of the pump unit 16 will be other than that closely adjacent zero and therefore the difficulties experienced utilizing a pump unit 16 as the sole supply of hydraulic fluid in a hydraulic transmission are overcome.

It is also pointed out here that while an example of the relative output ratios of the pump units 16 and 18 has been set forth here and above, this may be varied as desired for the particular transmission.

Although only a preferred embodiment of the hydraulic transmission has been specifically illustrated and described herein, it is to be understood that minor variations may be made in the transmission without departing from the spirit and scope of the invention as defined by the appended claims.

I claim:

1. A hydraulic pump combination for supplying hydraulic fluid under pressure to a hydraulic motor at variable rates and in reversible directions, said pump combination comprising first and second pumps constantly directly connected in parallel in fixed relation to first and second lines for a hydraulic motor, said first pump being a variable volume, variable direction pump, and said second pump being a constant volume, constant direction pump.

2. The pump combination of claim 1 wherein said second pump volume is less than the maximum volume of said first pump.

3. The pump combination of claim 2 wherein the ratio of said second pump volume to said first pump maximum volume is on the order of 1 to 2 with the forward output volume to the reverse output volume being on the order of 3 to 1.

4. The pump combination of claim 2 wherein the output of said second pump is always positive, and the combined output of said pump combination is zero when the output of said first pump is equal to the output of said second pump but in a reverse position.

5. The pump combination of claim 1 together with a hydraulic motor connected to said first and second lines in fixed relationship, said pumps and said motor forming a hydraulic transmission.

6. The combination of claim 5 wherein said pumps have drive shafts, and means connecting said drive shafts together for constant relative rotation.

7. The combination of claim 5 wherein said second pump volume is less than the maximum volume of said first pump.

8. The combination of claim 7 wherein the ratio of said second pump volume to said first pump maximum volume is on the order of 1 to 2 with the forward output volume to the reverse output volume being on the order of 3 to 1.

9. The combination of claim 7 wherein the output of said second pump is always positive, and the combined output of said pump combination is zero when the output of said first pump is equal to the output of said second pump but in a reverse direction.

* * * * *